US012276159B2

(12) United States Patent
Huang

(10) Patent No.: US 12,276,159 B2
(45) Date of Patent: Apr. 15, 2025

(54) WINDOW SHADE AND ACTUATING SYSTEM THEREOF

(71) Applicant: Teh Yor Co., Ltd., New Taipei (TW)

(72) Inventor: Chien-Fong Huang, City of Industry, CA (US)

(73) Assignee: Teh Yor Co., Ltd., New Taipei (TW)

( * ) Notice: Subject to any disclaimer, the term of this patent is extended or adjusted under 35 U.S.C. 154(b) by 9 days.

(21) Appl. No.: 17/735,764

(22) Filed: May 3, 2022

(65) Prior Publication Data

US 2022/0356762 A1 Nov. 10, 2022

Related U.S. Application Data

(60) Provisional application No. 63/183,873, filed on May 4, 2021.

(51) Int. Cl.

*E06B 9/88* (2006.01)
*E06B 9/322* (2006.01)
*E06B 9/80* (2006.01)

(52) U.S. Cl.

CPC ................ *E06B 9/88* (2013.01); *E06B 9/322* (2013.01); *E06B 2009/801* (2013.01)

(58) Field of Classification Search

CPC .. E06B 9/324; E06B 9/322; E06B 2009/3225; E06B 9/88; E06B 2009/801; E06B 9/80; E06B 2009/3222

See application file for complete search history.

(56) References Cited

U.S. PATENT DOCUMENTS 5,103,888 A * 4/1992 Nakamura .............. E06B 9/308 160/171
6,644,373 B2 * 11/2003 Palmer .................... E06B 9/322 160/192

(Continued)

FOREIGN PATENT DOCUMENTS

JP 2004-169473 A 6/2004
JP 2005-200942 A 7/2005

(Continued)

OTHER PUBLICATIONS

International Search Report in the parent PCT application No. PCT/US2022/027455, dated Aug. 19, 2022.

(Continued)

*Primary Examiner* — Daniel P Cahn
*Assistant Examiner* — John W Hanes, Jr.
(74) *Attorney, Agent, or Firm* — Chen Yoshimura LLP

(57) ABSTRACT

An actuating system for a window shade includes a rotary axle, a cord winding assembly and a limiting mechanism. The cord winding assembly is coupled to the rotary axle and is connected with a plurality of suspension cords, the rotary axle being rotatable to cause the cord winding assembly to wind and unwind the suspension cords for displacing a movable rail of a window shade. The limiting mechanism includes a latch coupled to one of the suspension cords, the latch being movable between a locking state for preventing rotation of the rotary axle and an unlocking state for rotation of the rotary axle, the limiting mechanism being configured so that tensioning and loosening of the one of the suspension cords causes the latch to switch between the locking state and the unlocking state.

17 Claims, 16 Drawing Sheets

(56) References Cited

U.S. PATENT DOCUMENTS

| | | | | |
|---|---|---|---|---|
| 7,198,089 B2 * | 4/2007 | Hsu | E06B 9/322 | 160/170 |
| 7,591,298 B2 * | 9/2009 | Egami | E06B 9/322 | 160/170 |
| 7,752,937 B1 * | 7/2010 | Dornan | F16H 55/18 | 74/411 |
| 2008/0128097 A1 | 6/2008 | Yu et al. | | |
| 2011/0259535 A1 | 10/2011 | Yu et al. | | |
| 2015/0020982 A1 * | 1/2015 | Anderson | E06B 9/326 | 16/110.1 |
| 2017/0081912 A1 | 3/2017 | Guillory | | |

FOREIGN PATENT DOCUMENTS

| | | |
|---|---|---|
| TW | 200821452 A | 5/2008 |
| TW | I722950 B | 3/2021 |

OTHER PUBLICATIONS

Written Opinion in the parent PCT application No. PCT/US2022/027455, dated Aug. 19, 2022.

Taiwanese Office Action, dated Nov. 28, 2022, in a counterpart Taiwanese patent application, No. TW 111116434. (English translation of the search report is attached.).

* cited by examiner

WINDOW SHADE AND ACTUATING SYSTEM THEREOF

CROSS-REFERENCE TO RELATED APPLICATION(S)

This application claims priority to U.S. provisional patent application No. 63/183,873 filed on May 4, 2021, the disclosure of which is hereby incorporated by reference.

BACKGROUND

1. Field of the Invention

The present invention relates to window shades, and actuating systems used in window shades.

2. Description of the Related Art

Some window shades may have a bottom rail and an intermediate rail that can be adjusted independent of each other. This type of window shades can offer differential light transmission regions above and below the intermediate rail. However, the ability to separately displace the bottom rail and the intermediate rail may result in undesirable interaction between the bottom rail and the intermediate rail during operation if no adequate restricting mechanisms were provided.

Therefore, there is a need for an improved actuating system that can be used in window shades and address at least the foregoing issues.

SUMMARY

The present application describes a window shade and an actuating system for use with the window shade that can address the foregoing issues.

According to an embodiment, an actuating system for a window shade includes a rotary axle, a cord winding assembly and a limiting mechanism. The cord winding assembly is coupled to the rotary axle and is connected with a plurality of suspension cords, the rotary axle being rotatable to cause the cord winding assembly to wind and unwind the suspension cords for displacing a movable rail of a window shade. The limiting mechanism includes a latch coupled to one of the suspension cords, the latch being movable between a locking state for preventing rotation of the rotary axle and an unlocking state for rotation of the rotary axle, the limiting mechanism being configured so that tensioning and loosening of the one of the suspension cords causes the latch to switch between the locking state and the unlocking state.

Moreover, the application describes a window shade that incorporates the actuating system.

DETAILED DESCRIPTION OF THE EMBODIMENTS

Figure 1:
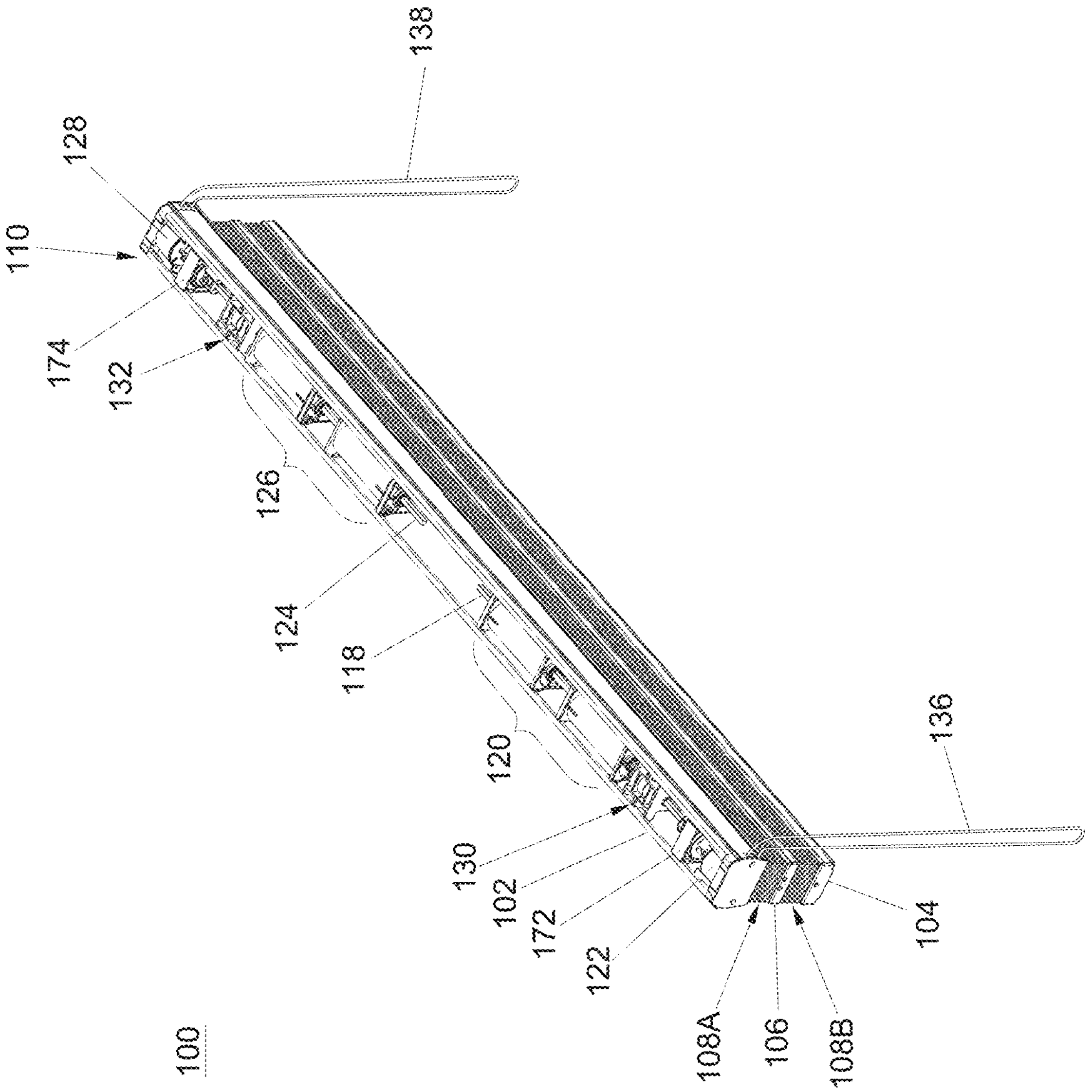
FIG. 1 is a perspective view illustrating an embodiment of a window shade.
Figure 2:
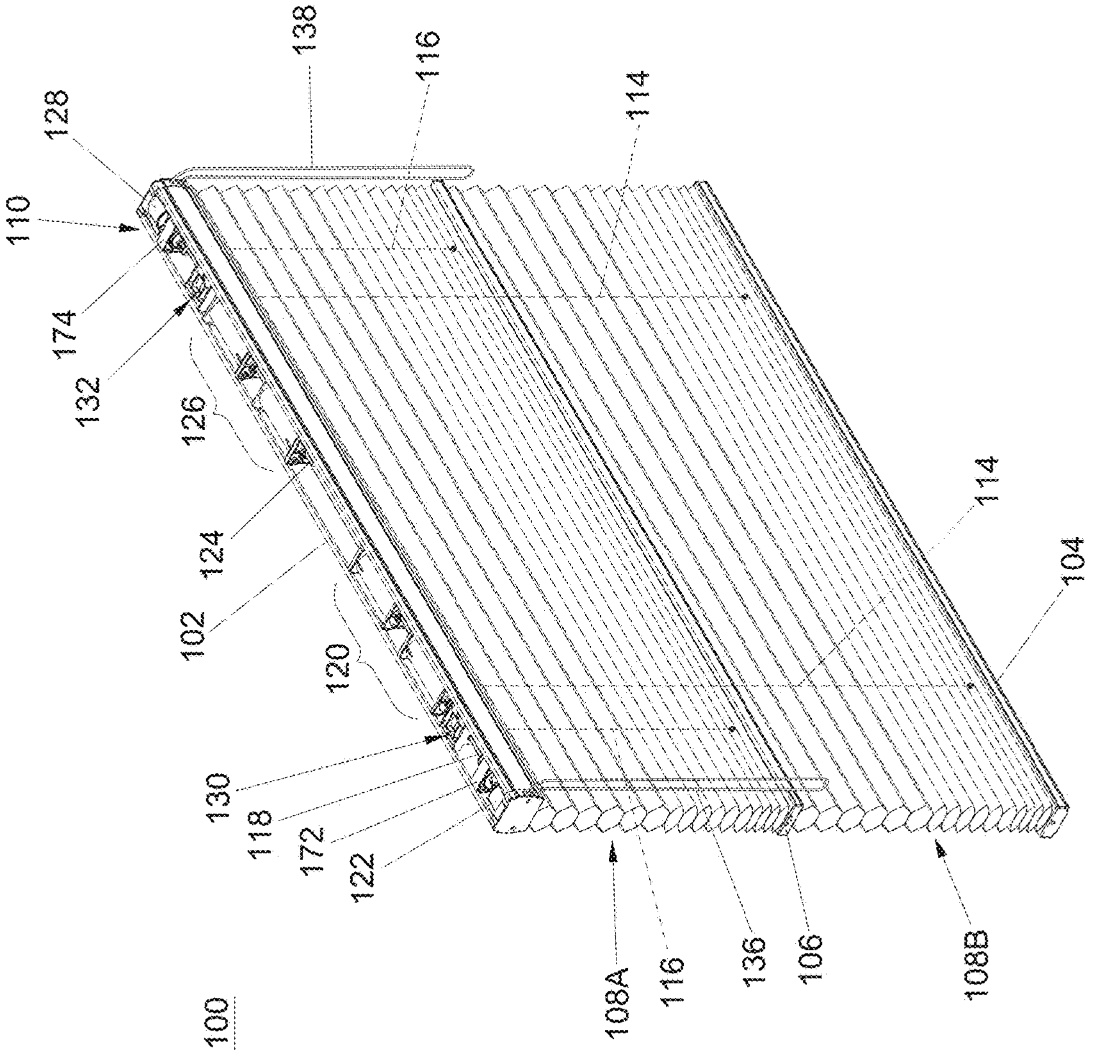
FIG. 2 is a perspective view illustrating the window shade having two movable rails lowered from a head rail.
Figure 3:
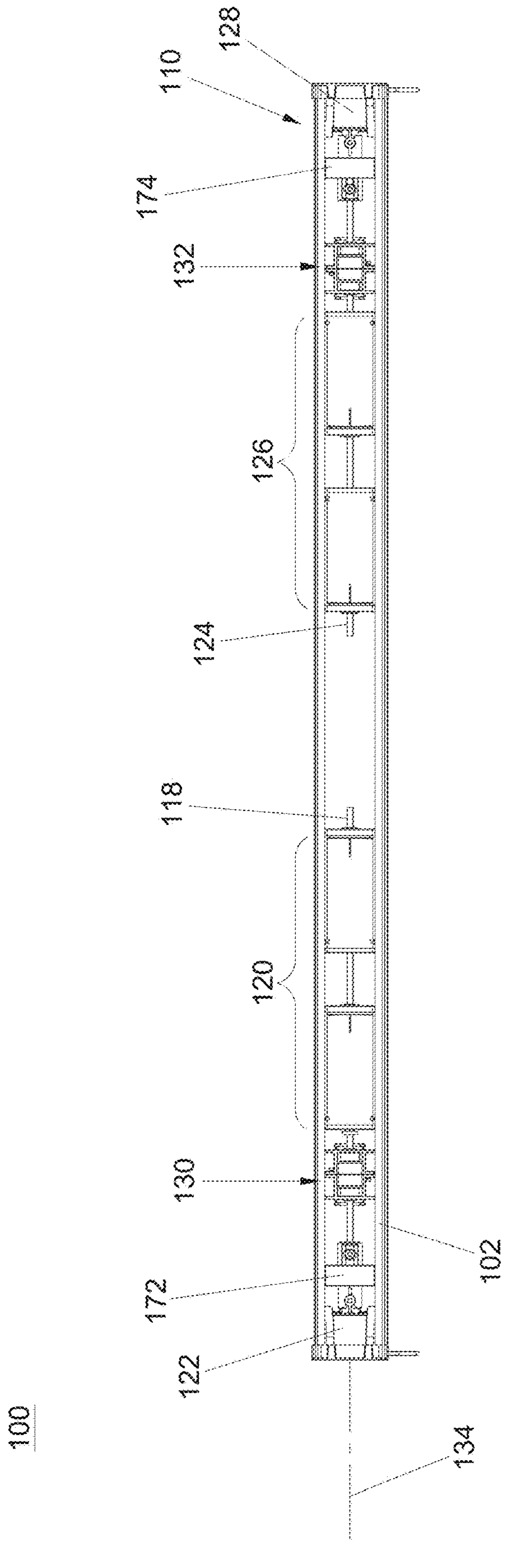
FIG. 3 is a top view of the window shade.

FIGS. 1 and 2 are perspective views respectively illustrating an embodiment of a window shade 100 in different states, and FIG. 3 is a top view of the window shade 100. Referring to FIGS. 1-3, the window shade 100 can include a head rail 102, two movable rails 104 and 106, two shading structures 108A and 108B and an actuating system 110.

The head rail 102 may be affixed at a top of a window frame, and can have any desirable shapes. According to an example of construction, the head rail 102 can have an elongate shape including a cavity for at least partially receiving the actuating system 110 of the window shade 100.

The movable rail 104 can be a bottom rail, and can be suspended from the head rail 102 with a plurality of suspension cords 114. According to an example of construction, the movable rail 104 may have a channel structure adapted to receive to the attachment of the shading structure 108B.

The movable rail 106 can be an intermediate rail disposed between the head rail 102 and the movable rail 104, and can be suspended from the head rail 102 with a plurality of suspension cords 116. The movable rail 106 may also have a channel structure adapted to receive the attachment of the shading structures 108A and 108B.

The shading structure 108A is disposed between the head rail 102 and the movable rail 106, and can be expanded or collapsed as the movable rail 106 moves away from or toward the head rail 102. The shading structure 108B is disposed between the movable rail 104 and the movable rail 106, and can be expanded or collapsed as the movable rail 104 moves away from or toward the movable rail 106. Each of the shading structures 108A and 108B may exemplary have a cellular structure, which may include, without limitation, honeycomb structures. However, it will be appreciated that the shading structures 108A and 108B may have any suitable structures that can be expanded and collapsed during use. In the illustrated example, the shading structure 108A exemplarily has a cellular structure including two opposite ends respectively attached to the head rail 102 and the movable rail 106, and the shading structure 108B exemplarily has a cellular structure including two opposite ends respectively attached to the movable rails 104 and 106.

Referring to FIGS. 1-3, each of the two movable rails 104 and 106 is independently movable vertically relative to the head rail 102 for setting the window shade 100 to a desirable configuration. For example, the movable rail 104 may be lowered away from the head rail 102 and the movable rail 106 to expand the shading structure 108B, or raised toward the head rail 102 and the movable rail 106 to collapse the shading structure 108B. The movable rail 106 may be lowered away from the head rail 102 and toward the movable rail 104 to expand the shading structure 108A, or raised away from the movable rail 104 and toward the head rail 102 to collapse the shading structure 108A. Although the illustrated example provides a shading structure 108A between the head rail 102 and the movable rail 106, other embodiments may omit the shading structure 108A. When the shading structure 108A is omitted, the two movable rails 104 and 106 may be lowered away from the head rail 102 to form a gap for light passage between the head rail 102 and the movable rail 106. The vertical position of the movable rail 104 and the vertical position of the movable rail 106 relative to the head rail 102 may be controlled with the actuating system 110.

Referring to FIGS. 1-3, the actuating system 110 is assembled with the head rail 102, and is operable to displace the movable rails 104 and 106 relative to the head rail 102 for adjustment. The actuating system 110 can include a rotary axle 118 and a cord winding assembly 120 rotationally coupled to the rotary axle 118, a control module 122 operatively coupled to the rotary axle 118, a rotary axle 124 and a cord winding assembly 126 rotationally coupled to the rotary axle 124, a control module 128 operatively coupled to the rotary axle 124, a limiting mechanism 130 operatively associated with the rotary axle 118, and a limiting mechanism 132 operatively associated with the rotary axle 124.

The rotary axle 118 is coupled to the cord winding assembly 120, and can rotate about a rotation axis 134. The cord winding assembly 120 is connected with the suspension cords 116 and is thereby coupled to the movable rail 106 via the suspension cords 116. The rotary axle 118 is rotatable about the rotation axis 134 to cause the cord winding assembly 120 to wind the suspension cords 116 for raising the movable rail 106 and to unwind the suspension cords 116 for lowering the movable rail 106. For example, the cord winding assembly 120 may include one or more rotary drum (not shown) that is rotationally coupled to the rotary axle 118 and is connected with one end of each suspension cord 116, and another end of each suspension cord 116 can be connected with the movable rail 106, whereby the one or more rotary drum can rotate along with the rotary axle 118 to wind or unwind the suspension cords 116.

The control module 122 is operatively coupled to the rotary axle 118 at an end thereof, and is operable to drive the rotary axle 118 to rotate in either direction about the rotation axis 134 for raising or lowering the movable rail 106. According to an example of construction, the control module 122 includes an operating member 136 that can hang downward from the head rail 102 and is operable to drive the rotary axle 118 to rotate in either direction for raising or lowering the movable rail 106. The operating member 136 can have a looped structure, which can include, without limitation, a looped bead chain, a looped cord, and the like. When the operating member 136 is not actuated, the movable rail 106 is held in position. For example, the control module 122 may typically include a spring clutch (not shown) configured to lock the rotary axle 118 when the operating member 136 is not actuated and release the rotary axle 118 for rotation upon actuation of the operating member 136.

The rotary axle 124 is coupled to the cord winding assembly 126, and can rotate independent of the rotary axle 118. According to an example of construction, the rotary axle 124 can be disposed substantially coaxial to the rotary axle 118 for a compact assembly. For example, the rotary axles 118 and 124 may be spaced apart from each other along the rotation axis 134. The cord winding assembly 126 is connected with the suspension cords 114 and is thereby coupled to the movable rail 104 via the suspension cords 114. The rotary axle 124 is rotatable about the rotation axis 134 to cause the cord winding assembly 126 to wind the suspension cords 114 for raising the movable rail 104 and to unwind the suspension cords 114 for lowering the movable rail 104. For example, the cord winding assembly 126 may include one or more rotary drum (not shown) that is rotationally coupled to the rotary axle 124 and is connected with one end of each suspension cord 114, and another end of each suspension cord 114 can be connected with the movable rail 104, whereby the one or more rotary drum can rotate along with the rotary axle 124 to wind or unwind the suspension cords 114.

The control module 128 is operatively coupled to the rotary axle 124 at an end thereof, and is operable independently of the control module 122 to drive the rotary axle 124 to rotate in either direction about the rotation axis 134 for raising or lowering the movable rail 104. According to an example of construction, the control module 128 includes an operating member 138 that can hang downward from the head rail 102 and is operable to drive the rotary axle 124 to rotate in either direction for raising or lowering the movable rail 104. The operating member 138 can have a looped structure, which can include, without limitation, a looped bead chain, a looped cord, and the like. When the operating member 138 is not actuated, the movable rail 104 is held in position. For example, the control module 128 may typically include a spring clutch (not shown) configured to lock the rotary axle 124 when the operating member 138 is not actuated and release the rotary axle 124 for rotation upon actuation of the operating member 138. The control module 128 may be similar to the control module 122 in construction, and the two control modules 122 and 128 may be respectively disposed at two opposite ends of the head rail 102.

Referring to FIGS. 1-3, the limiting mechanism 130 operatively associated with the rotary axle 118 has a locking state preventing rotation of the rotary axle 118 and an unlocking state for rotation of the rotary axle 118, and is configured so that tensioning and loosening of the suspension cords 116 causes the limiting mechanism 130 to switch between the locking state and the unlocking state. In conjunction with FIGS. 1-3, FIG. 4 is a perspective view illustrating the limiting mechanism 130, FIG. 5 is an exploded view of the limiting mechanism 130, and FIG. 6 is a cross-sectional view of the limiting mechanism 130. Referring to FIGS. 1-6, the limiting mechanism 130 can include a housing 140, a latch 142 and a resilient part 144.

The housing 140 is adapted to be mounted inside the head rail 102, and can have an inner cavity in which the latch 142 and the resilient part 144 are disposed. For example, the housing 140 can include two casing portions 146A and 146B that are attached to each other to define at least partially the inner cavity of the housing 140, and the latch 142 and the resilient part 144 can be disposed inside the inner cavity of the housing 140 between the two casing portions 146A and 146B. Moreover, the housing 140 is adapted to receive the passage of the rotary axle 118 and at least one of the suspension cords 116, which can enter the housing 140 at an end 140A thereof and exit the housing 140 at another end 140B of the housing 140 opposite to the end 140A.

The latch 142 is movably connected with the housing 140, and is coupled to one of the suspension cords 116 that passes through the housing 140. The latch 142 is movable between the locking state for preventing rotation of the rotary axle 118 and the unlocking state for rotation of the rotary axle 118, and tensioning and loosening of the suspension cord 116 can cause the latch 142 to switch between the locking state and the unlocking state. More specifically, the limiting mechanism 130 can be configured so that tensioning of the suspension cord 116 causes the latch 142 to switch to the unlocking state, and loosening of the suspension cord 116 causes the latch 142 to switch to the locking state.

Figure 4:
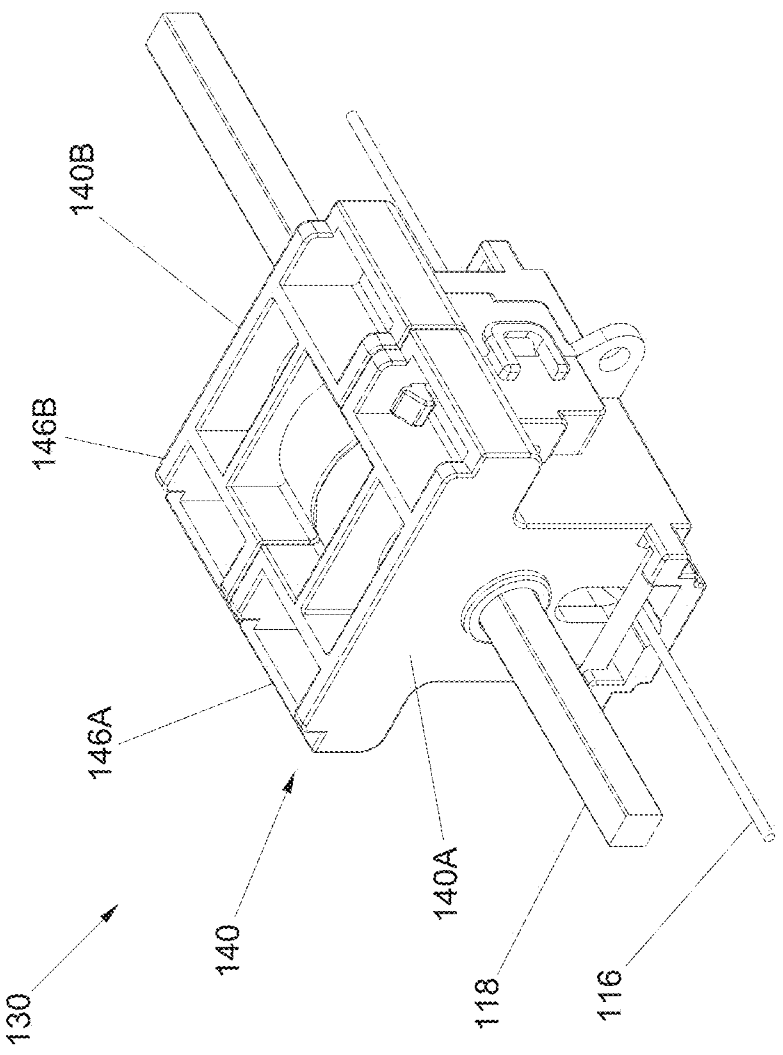
FIG. 4 is a perspective view illustrating a limiting mechanism that can be provided in an actuating system suitable for use in the window shade.
Figure 5:
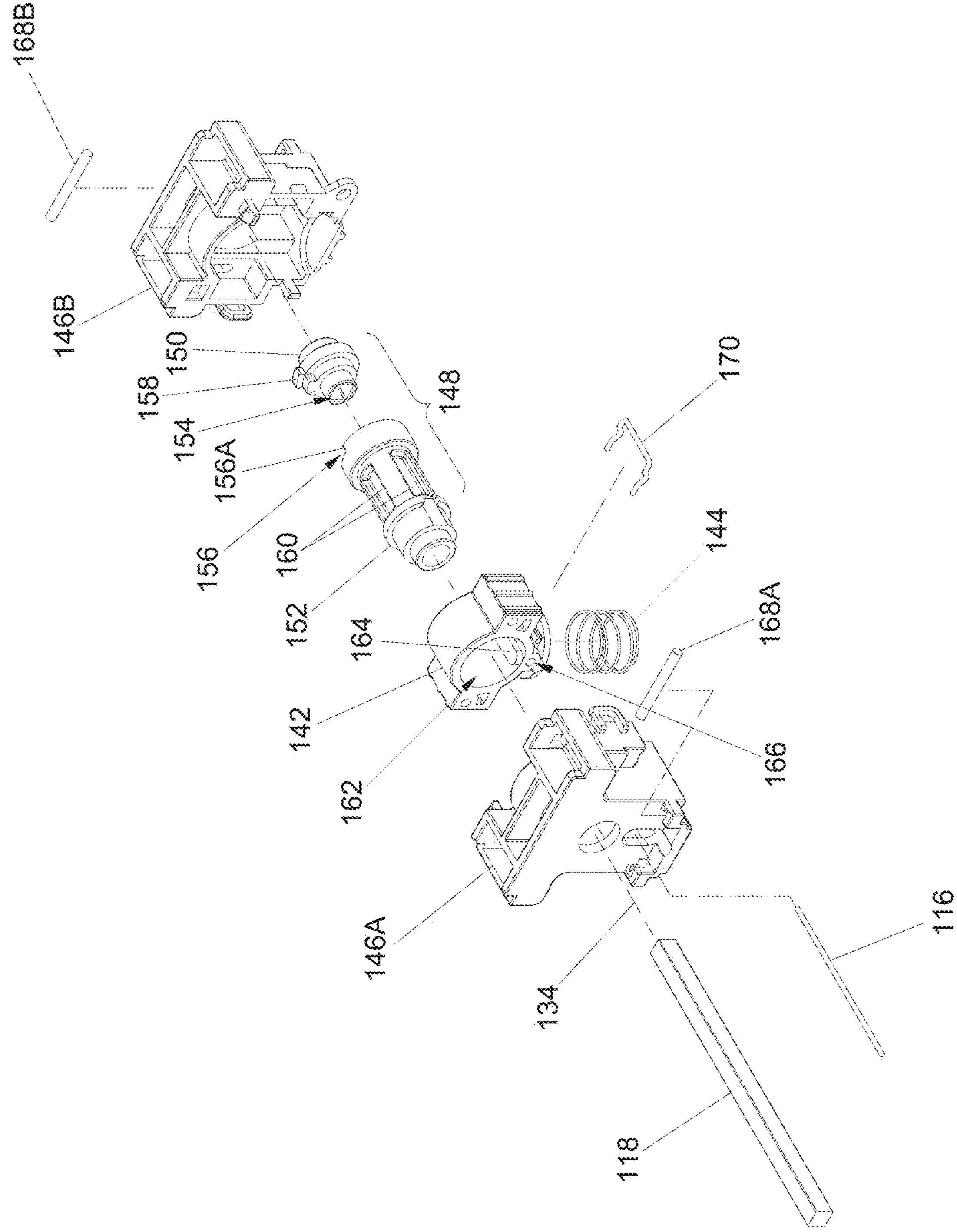
FIG. 5 is an exploded view of the limiting mechanism shown in FIG. 4.
Figure 6:
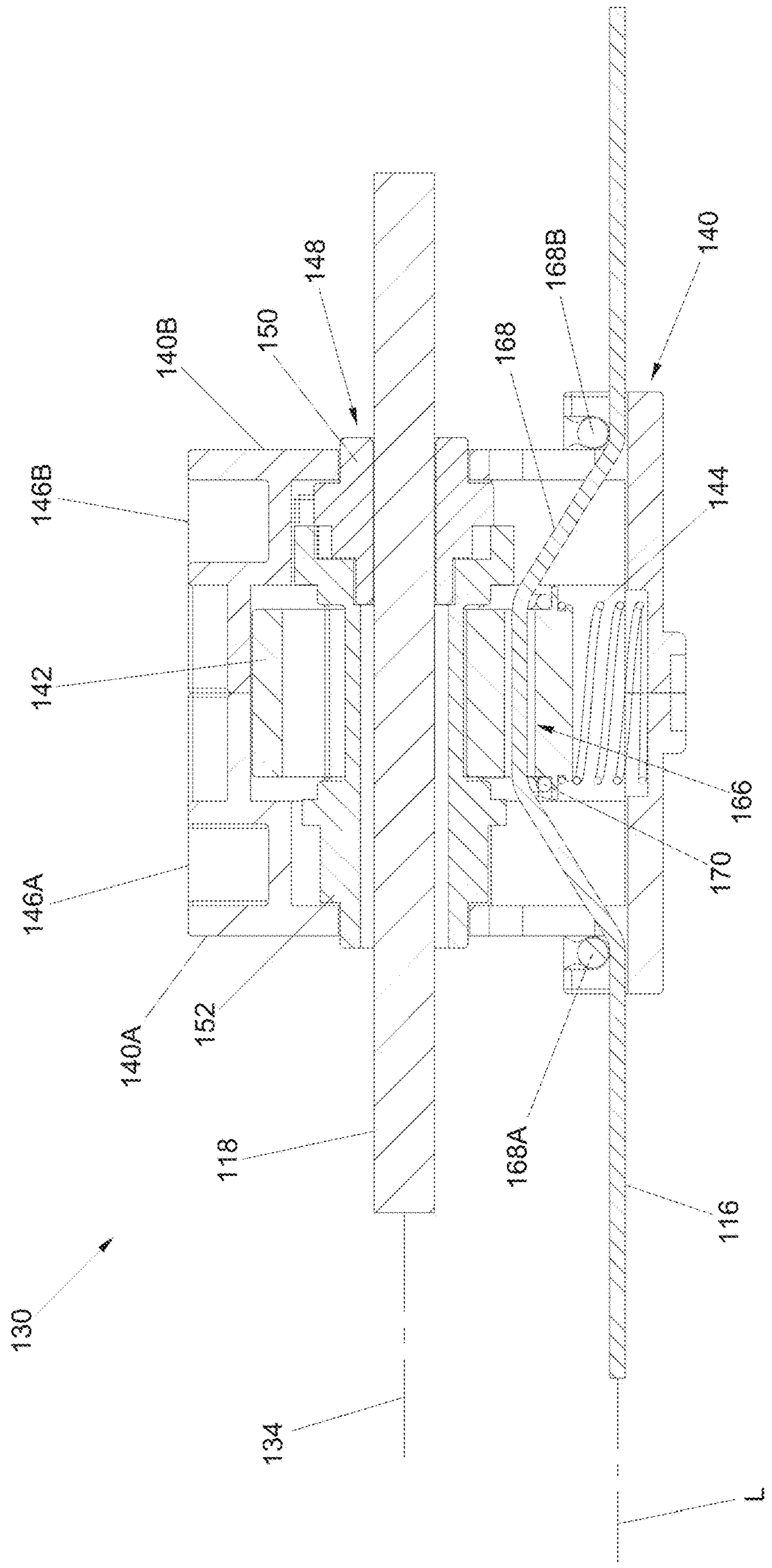
FIG. 6 is a cross-sectional view of the limiting mechanism shown in FIG. 4.
Figure 7:
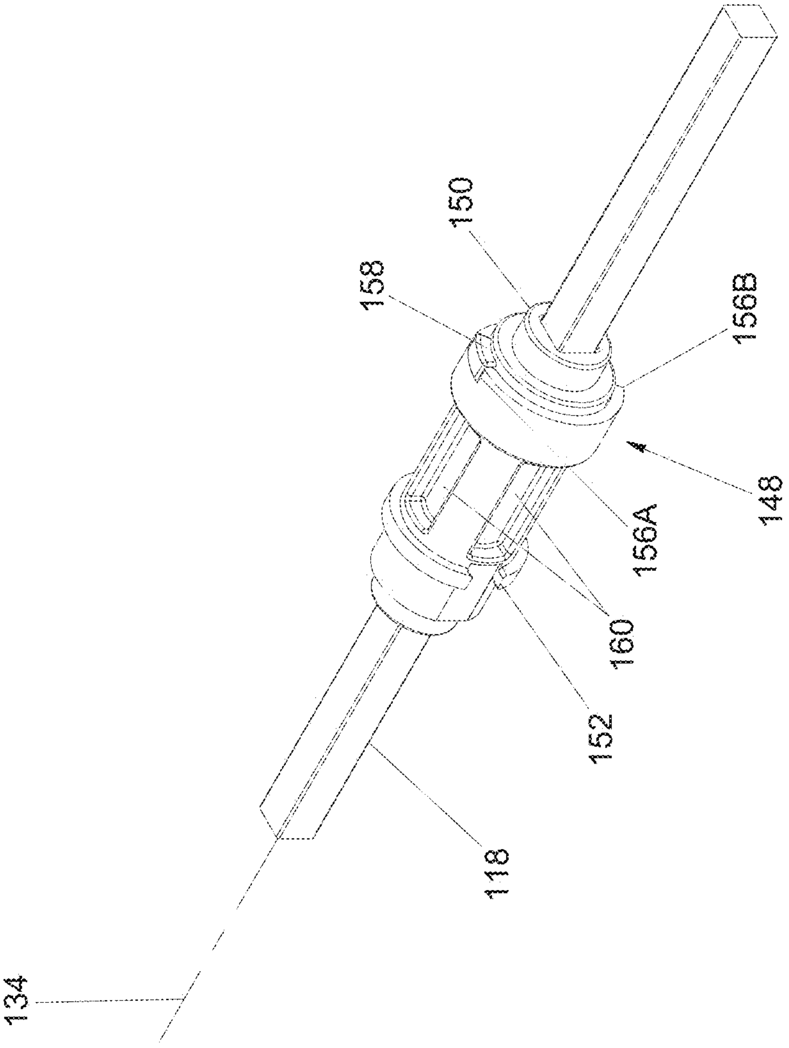
FIG. 7 is a perspective view illustrating some construction details of the limiting mechanism shown in FIG. 4.
Figure 8:
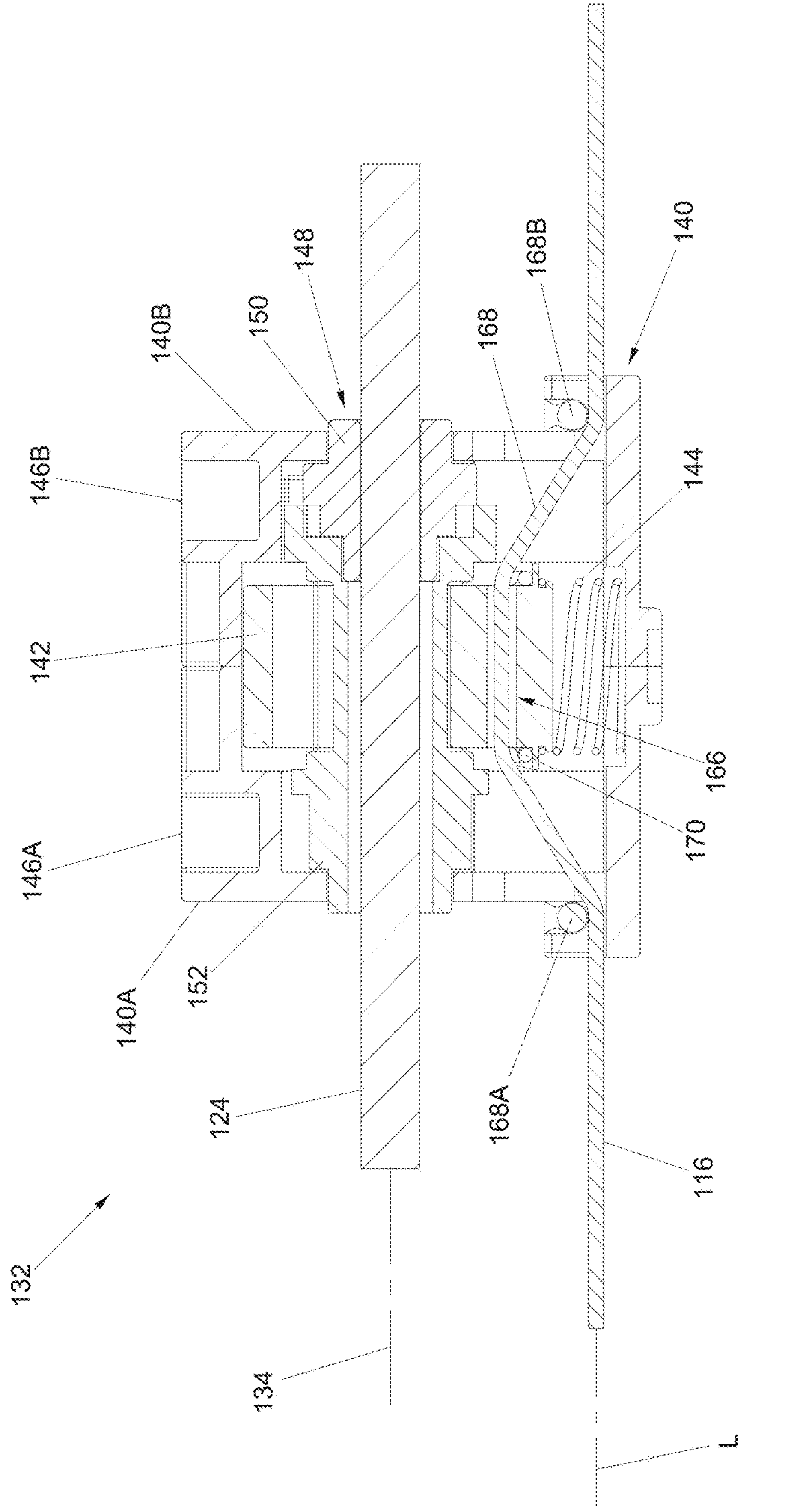
FIG. 8 is a cross-sectional view illustrating another limiting mechanism that can be provided in the actuating system of the window shade.

Referring to FIGS. 4-6, the rotary axle 118 may be coupled to an axle connector 148 for facilitating a locking engagement of the latch 142 in the locking state. Both the rotary axle 118 and the axle connector 148 are rotatable in unison about the rotation axis 134 to cause the cord winding assembly 120 to wind and unwind the suspension cords 116, and the latch 142 can be engaged with the axle connector 148 in the locking state and disengaged from the axle connector 148 in the unlocking state. FIG. 7 is a perspective view illustrating the axle connector 148 assembled around the rotary axle 118.

According to an example of construction, the axle connector 148 can include an adapter 150 and a sleeve 152, and can be configured to allow a limited range of free rotational displacement of the adapter 150 and the rotary axle 118 about the rotation axis 134 relative to the sleeve 152. The adapter 150 is rotationally coupled to the rotary axle 118. For example, the rotary axle 118 can have a keyed cross-section (e.g., rectangular shape, square shape, cross shape, and the like), and the adapter 150 can have a hole 154 having a matching shape through which the rotary axle 118 is disposed for rotationally coupling the adapter 150 to the rotary axle 118. Accordingly, the rotary axle 118 and the adapter 150 always rotate in unison once they are assembled together.

Referring to FIGS. 4-7, the sleeve 152 is disposed around the adapter 150, and can rotate about the rotation axis 134 along with the rotary axle 118 and the adapter 150. Moreover, any suitable structures may be provided between the adapter 150 and the sleeve 152 for setting a limited range of free rotational displacement of the adapter 150 relative to the sleeve 152. For example, the sleeve 152 may have a slot 156 extending along an arc centered on the rotation axis 134, and the adapter 150 can have an eccentric protrusion 158 movably received at least partially in the slot 156. It will be appreciated that the slot 156 and the eccentric protrusion 158 may be interchanged in position: the slot 156 may be provided on the adapter 150, and the eccentric protrusion 158 may be provided on the sleeve 152. The adapter 150 and the sleeve 152 may rotate in unison along with the rotary axle 118 in one direction with the eccentric protrusion 158 in contact with one end 156A of the slot 156 and in another opposite direction with the eccentric protrusion 158 in contact with an opposite end 156B of the slot 156, and a course of the eccentric protrusion 158 within the slot 156 between the two ends 156A and 156B thereof can correspond to the limited range of free rotational displacement of the adapter 150 and the rotary axle 118 about the rotation axis 134 relative to the sleeve 152.

Referring to FIGS. 4-7, the latch 142 can be engaged with the sleeve 152 of the axle connector 148 in the locking state and disengaged from the sleeve 152 of the axle connector 148 in the unlocking state. For facilitating the locking engagement of the latch 142, the sleeve 152 may have an outer surface provided with a plurality of locking grooves 160 distributed around the rotation axis 134, and the latch 142 can engage with any of the locking grooves 160 in the locking state.

Referring to FIGS. 4-7, the latch 142 can be slidably connected with the housing 140, and can slide relative to the housing 140 for switching between the locking state and the unlocking state. For example, the latch 142 can be disposed inside the housing 140 for sliding substantially orthogonal to the rotary axle 118 to switch between the locking state and the unlocking state. According to an example of construction, the latch 142 can have a cavity 162 through which is disposed the axle connector 148, and a protrusion 164 provided inside the cavity 162 that is adapted to engage with any of the locking grooves 160 on the sleeve 152 of the axle connector 148. The latch 142 can slide relative to the housing 140 between the locking state where the protrusion 164 can be engaged with any of the locking grooves 160 on the sleeve 152 of the axle connector 148, and the unlocking state where the protrusion 164 can be disengaged from the locking grooves 160 on the sleeve 152 of the axle connector 148.

The resilient part 144 is connected with the latch 142, and is adapted to bias the latch 142 toward the locking state. According to an example of construction, the resilient part 144 may be a spring having two ends respectively connected with the housing 140 and the latch 142. The biasing force applied by the resilient part 144 may urge the latch 142 to slide for engaging the protrusion 164 with the sleeve 152 of the axle connector 148.

Referring to FIGS. 4-6, the suspension cord 116 passing through the housing 140 can be disposed in sliding contact with the latch 142. For example, the latch 142 can have a passage 166, and the suspension cord 116 can be threaded through the passage 166 at a location eccentric from the rotary axle 118. As the rotary axle 118 rotates to cause the cord winding assembly 120 to wind or unwind the suspension cord 116, the suspension cord 116 can travel through the limiting mechanism 130 in sliding contact with the latch 142. Accordingly, the latch 142 can be operatively coupled to the suspension cord 116.

The suspension cord 116 can be guided through the housing 140 and the latch 142 in such a way that tensioning of the suspension cord 116 can urge the latch 142 to move to the unlocking state against the biasing force of the resilient part 144, and loosening of the suspension cord 116 allows the latch 142 to move to the locking state under the biasing force of the resilient part 144. For example, the suspension cord 116 may exit the housing 140 at the two ends 140A and 140B thereof substantially adjacent to the level of a line L, and can have a turn portion 168 inside the housing 140 that extends away from the line L and passes through the latch 142. For guiding the suspension cord 116, two guide parts 168A and 168B may be respectively attached to the housing 140 adjacent to the two ends 140A and 140B thereof, and a guide part 170 may be attached to the latch 142. The suspension cord 116 can be in sliding contact with the guide parts 168A, 168B and 170, which can assist in bending the suspension cord 116 along its travel path.

In conjunction with FIGS. 1-6, FIG. 8 is a cross-sectional view illustrating the limiting mechanism 132 operatively associated with the rotary axle 124. Referring to FIGS. 1-6 and 8, the limiting mechanism 132 has a locking state preventing rotation of the rotary axle 124 and an unlocking state for rotation of the rotary axle 124, and is configured so that tensioning and loosening of the suspension cords 116 causes the limiting mechanism 132 to switch between the locking state and the unlocking state. More specifically, the limiting mechanism 132 can be similar to the limiting mechanism 130 in construction, including the housing 140, the latch 142, the resilient part 144 and the axle connector 148 like described previously. In the limiting mechanism 132, the latch 142 can be likewise coupled to one of the suspension cords 116 passing the housing 140, and the axle connector 148 can be coupled to the rotary axle 124. According to an example of construction, the suspension cord 116 that is coupled to the latch 142 of the limiting mechanism 132 and the suspension cord 116 that is coupled to the latch 142 of the limiting mechanism 130 may be two different suspension cords 116. For example, the latch 142 of the limiting mechanism 130 may be coupled to one suspension cord 116 that is connected with the movable rail 106 at one of a left and a right side thereof (e.g., the suspension cord 116 on the left side in FIG. 2), and the latch 142 of the limiting mechanism 132 may be coupled to another suspension cord 116 that is connected with the movable rail 106 at the other one of the left and right side thereof (e.g., the suspension cord 116 on the right side in FIG. 2). However, a variant construction may have a same suspension cord 116 that extends between the limiting mechanisms 130 and 132 and is respectively coupled to the latch 142 of the limiting mechanism 130 and the latch 142 of the limiting mechanism 132. The limiting mechanism 132 can operate similar to the limiting mechanism 130. The latch 142 of the limiting mechanism 132 is movable between the locking state and the unlocking state, tensioning of the suspension cord 116 causes the latch 142 of the limiting mechanism 132 to switch to the unlocking state for rotation of the rotary axle 124, and loosening of the suspension cord 116 causes the latch 142 of the limiting mechanism 132 to switch to the locking state for preventing rotation of the rotary axle 124.

Figure 9:
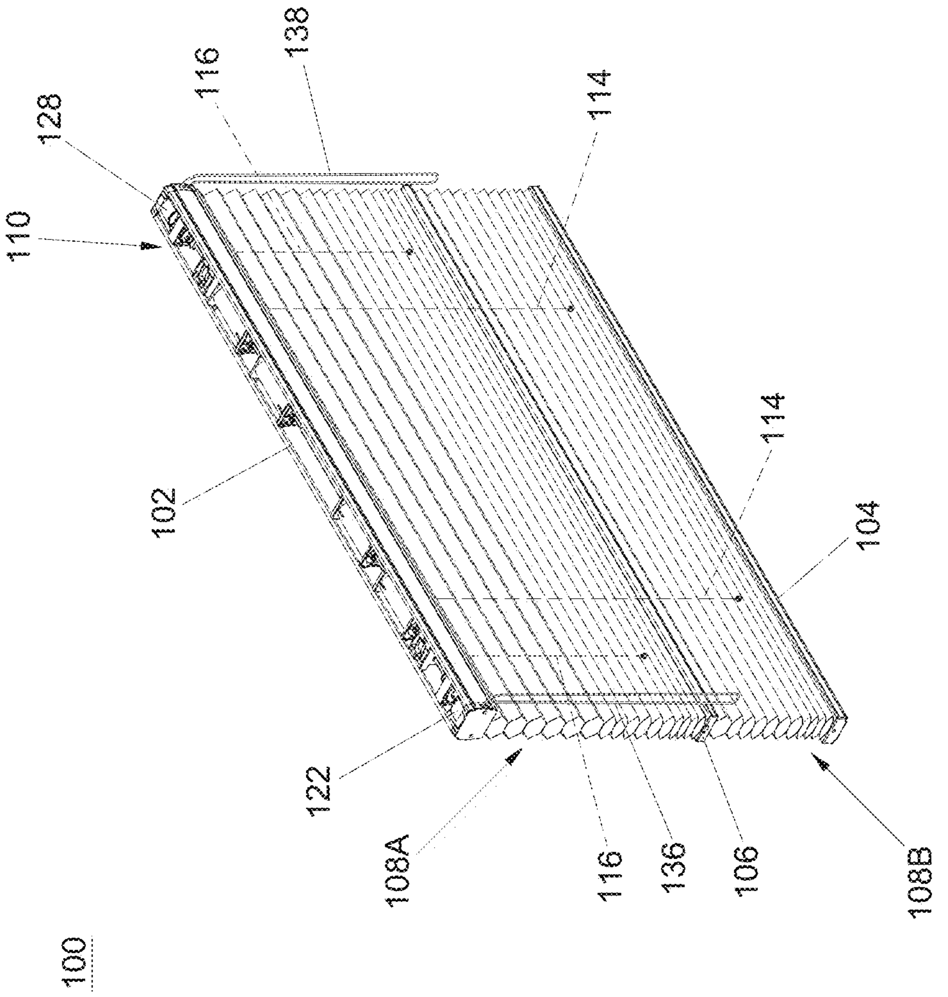
FIG. 9 is a perspective view illustrating the window shade of FIG. 1 in a configuration where the two movable rails are apart from each other.
Figure 10:
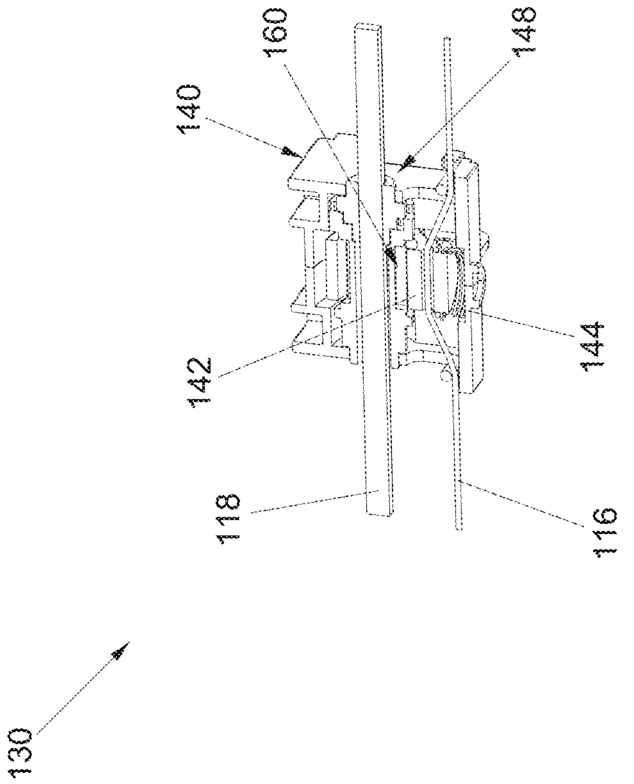
FIG. 10 is a cross-sectional view illustrating the limiting mechanism shown in FIG. 6 in an unlocking state.

In conjunction with FIGS. 1-7, FIGS. 9-12 are various views illustrating exemplary operation of the limiting mechanism 130. Referring to FIGS. 9 and 10, when the movable rail 106 is located away from the movable rail 104, a load applied by the movable rail 106 can tension the suspension cords 116 and thereby keep the latch 142 of the limiting mechanism 130 in the unlocking state disengaged from the axle connector 148. Accordingly, a user can actuate the operating member 136 of the control module 122 to drive the rotary axle 118 to rotate in either direction for adjustment of the movable rail 106 relative to the head rail 102 and the movable rail 104. The latch 142 of the limiting mechanism 130 can remain in the unlocking state during adjustment of the movable rail 106 relative to the head rail 102 and the movable rail 104.

Figure 11:
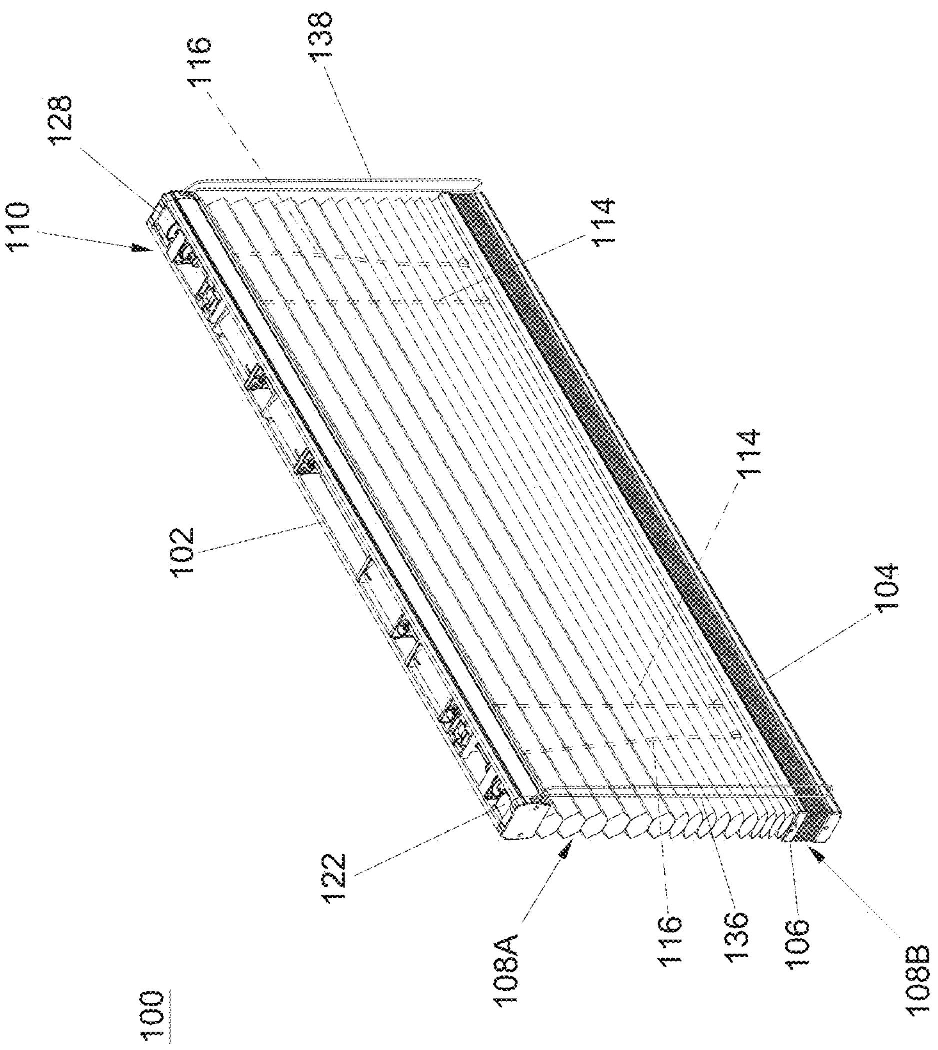
FIG. 11 is a perspective view illustrating the window shade with one movable rail lowered to a position adjacent to the other movable rail.
Figure 12:
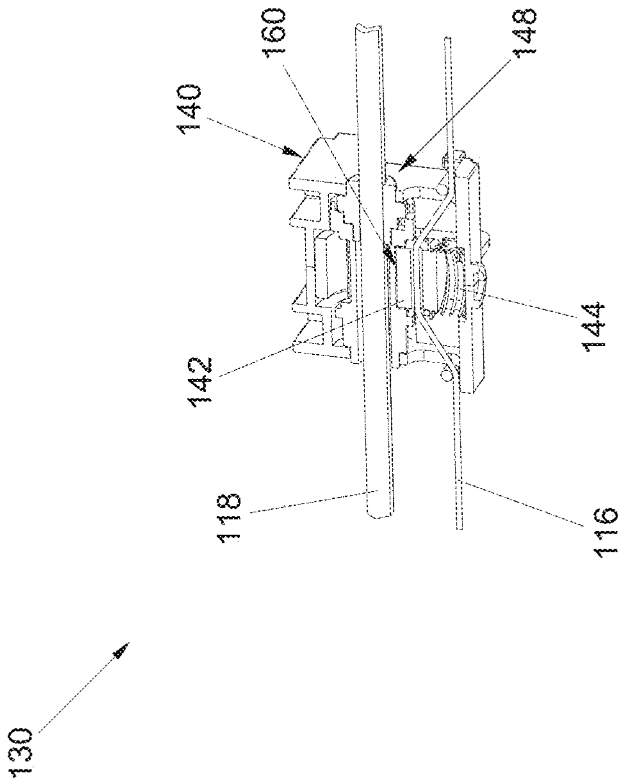
FIG. 12 is a cross-sectional view illustrating the limiting mechanism shown in FIG. 6 in a locking state.

Referring to FIGS. 11 and 12, when the movable rail 106 lowers to a position adjacent to or in contact with the movable rail 104, the movable rail 104 and/or the shading structure 108B can apply an upward resisting force on the movable rail 106, and the suspension cords 116 can loosen. As a result, the latch 142 of the limiting mechanism 130 can move from the unlocking state to the locking state and engage with the axle connector 148 under the biasing force of the resilient part 144, which prevents rotation of the rotary axle 118 about the rotation axis 134. Accordingly, the operating member 136 of the control module 122 cannot be actuated in a direction that further lowers the movable rail 106. Excessive downward course of the movable rail 106 can be thereby prevented.

While the latch 142 of the limiting mechanism 130 is in the locking state, a user can actuate the operating member 136 of the control module 122 in a reverse direction for raising the movable rail 106 away from the movable rail 104. As a result, the rotary axle 118 and the adapter 150 coupled thereto can rotate relative to the sleeve 152 so that the eccentric protrusion 158 of the adapter 150 can move within the slot 156 of the sleeve 152 from one of the two ends 156A and 156B of the slot 156 to the other one of the two ends 156A and 156B. This rotational displacement of the rotary axle 118 and the adapter 150 relative to the sleeve 152 can displace the movable rail 106 away from the movable rail 104 and thereby tension the suspension cords 116. As a result, the latch 142 can be urged by the suspension cord 116 coupled thereto to move from the locking state to the unlocking state, and the rotary axle 118 and the axle connector 148 comprised of the adapter 150 and the sleeve 152 then can rotate in unison for raising the movable rail 106.

Figure 13:
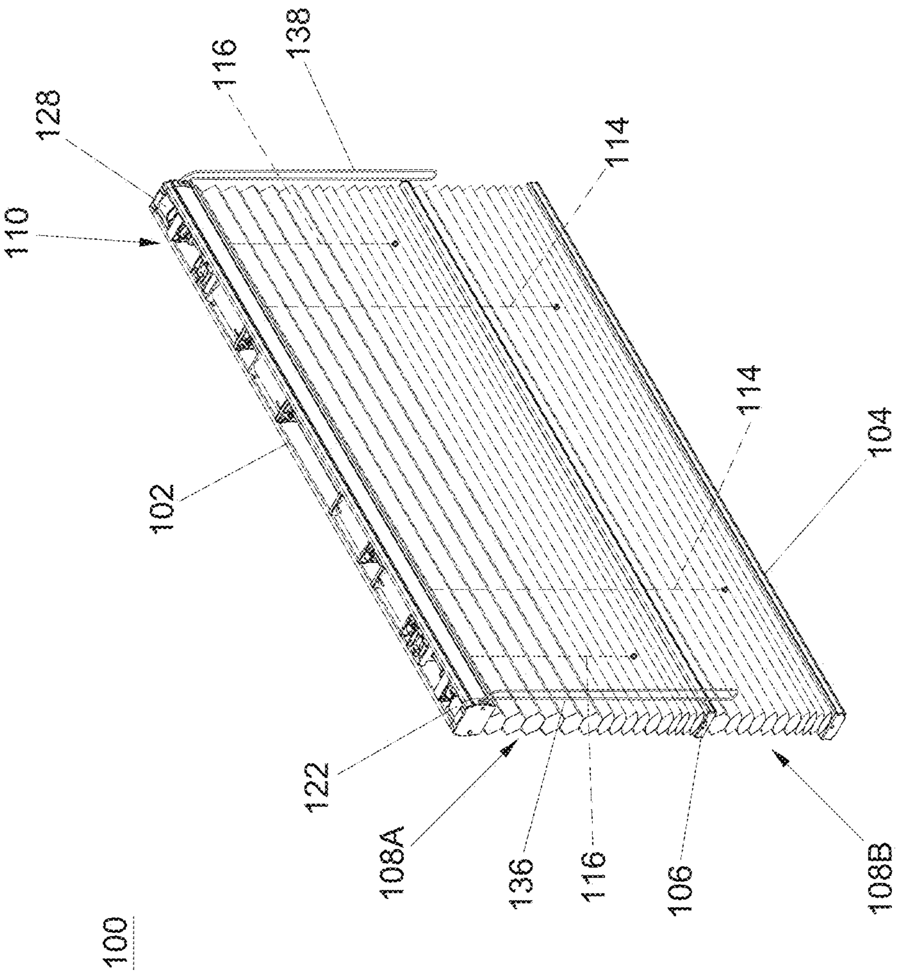
FIG. 13 is a perspective view illustrating the window shade in a configuration where the two movable rails are apart from each other.
Figure 14:
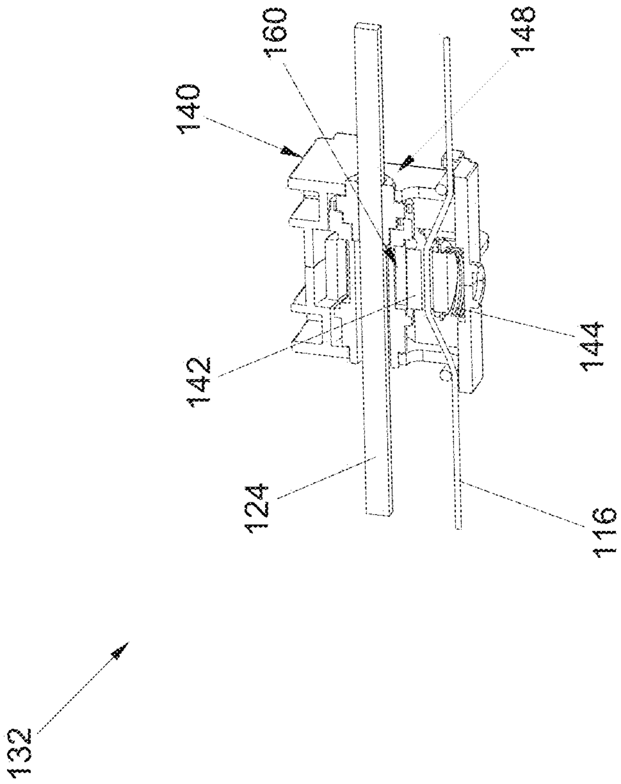
FIG. 14 is a cross-sectional view illustrating the limiting mechanism shown in FIG. 8 in an unlocking state.

In conjunction with FIGS. 1-6 and 8, FIGS. 13-16 are various views illustrating exemplary operation of the limiting mechanism 132. Referring to FIGS. 13 and 14, when the movable rail 104 is located away from the movable rail 106, a load exerted by the movable rail 106 can tension the suspension cords 116 and thereby keep the latch 142 of the limiting mechanism 132 in the unlocking state disengaged from the axle connector 148 of the limiting mechanism 132. Accordingly, a user can actuate the operating member 138 of the control module 128 to drive the rotary axle 124 to rotate in either direction for adjustment of the movable rail 104 relative to the head rail 102 and the movable rail 106, or can actuate the operating member 136 of the control module 122 to drive the rotary axle 118 to rotate in either direction for adjustment of the movable rail 106 relative to the head rail 102 and the movable rail 104. The latch 142 of the limiting mechanism 132 can remain in the unlocking state during adjustment of the movable rail 104 or 106.

Figure 15:
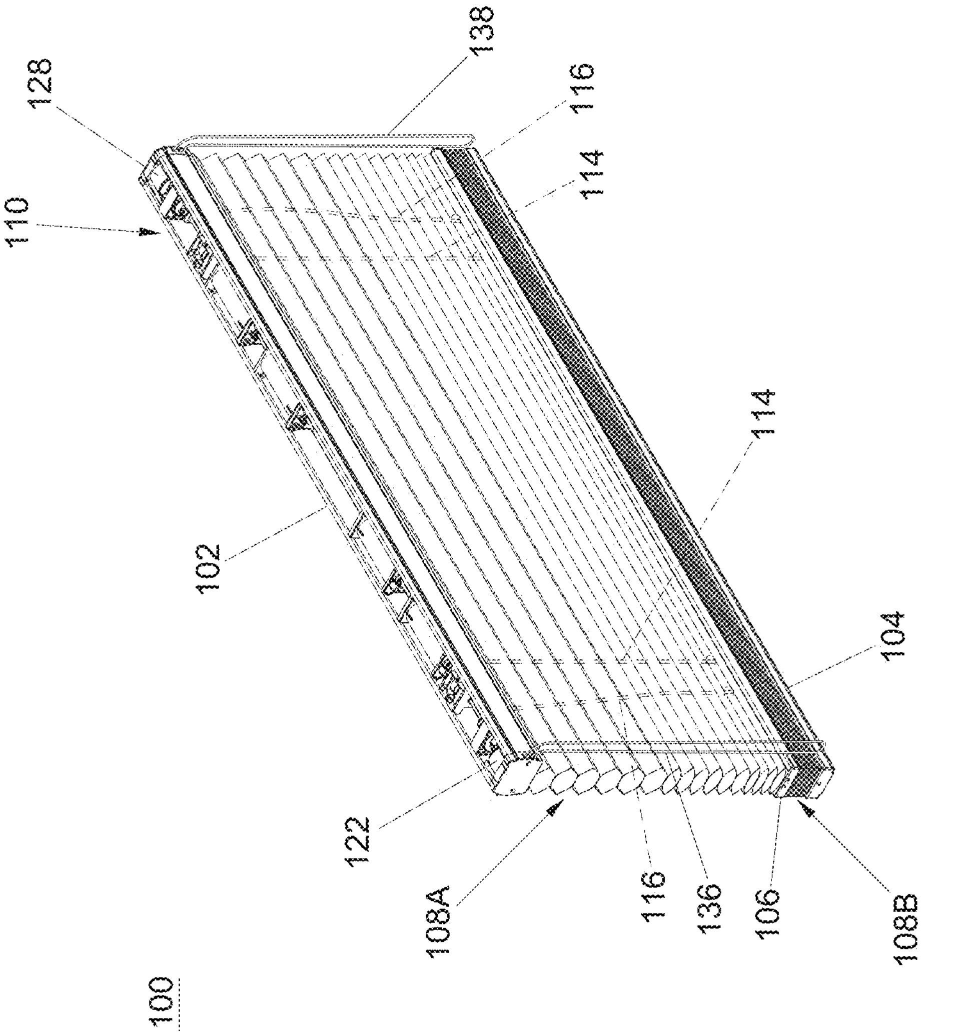
FIG. 15 is a perspective view illustrating the window shade with one movable rail raised to a position adjacent to the other movable rail.
Figure 16:
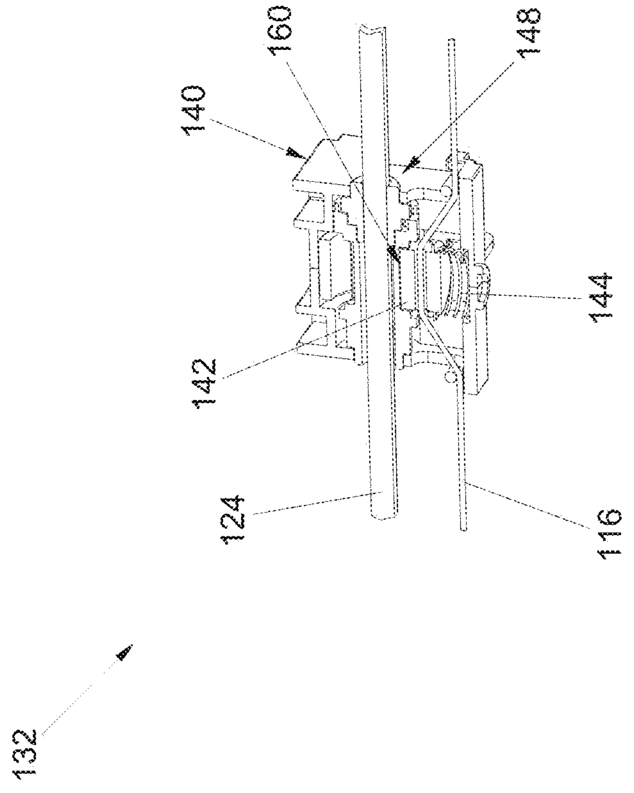
FIG. 16 is cross-sectional view illustrating the limiting mechanism shown in FIG. 8 in a locking state.

Referring to FIGS. 15 and 16, when the movable rail 104 rises to a position adjacent to or in contact with the movable rail 106, the movable rail 106 may be pushed upward and the suspension cords 116 coupled thereto can loosen. As a result, the latch 142 of the limiting mechanism 132 can move from the unlocking state to the locking state and engage with the axle connector 148 under the biasing force of the resilient part 144, which prevents rotation of the rotary axle 124. Accordingly, the operating member 138 of the control module 128 cannot be actuated in a direction that further raises the movable rail 104. Excessive upward course of the movable rail 104 can be thereby prevented.

While the latch 142 of the limiting mechanism 132 is in the locking state, a user can actuate the operating member 138 of the control module 128 in a reverse direction for lowering the movable rail 104 away from the movable rail 106. As a result, the rotary axle 124 and the adapter 150 coupled thereto can rotate relative to the sleeve 152. This rotational displacement of the rotary axle 124 and the adapter 150 relative to the sleeve 152 can displace the movable rail 104 away from the movable rail 106 and thereby allow tensioning of the suspension cords 116. As a result, the latch 142 of the limiting mechanism 132 can be urged by the suspension cord 116 coupled thereto to move from the locking state to the unlocking state, and the rotary axle 124 and the axle connector 148 comprised of the adapter 150 and the sleeve 152 then can rotate in unison for lowering the movable rail 104.

Referring to FIGS. 1-3, the actuating system 110 can further include two decelerating modules 172 and 174 respectively coupled to the rotary axles 118 and 124. The decelerating modules 172 and 174 may be adapted to apply some resisting forces to the rotary axles 118 and 124 for smooth adjustment of the movable rails 104 and 106.

Advantages of the structures described herein include the ability to provide a window shade that has an actuating system operable to independently displace an intermediate rail and a bottom rail for setting the window shade to a desired configuration. Moreover, the actuating system can have limiting mechanisms that can prevent undesirable upward displacement of the intermediate rail caused by a rise of the bottom rail and undesirable downward displacement of the bottom rail caused by a downward displacement of the intermediate rail. Therefore undesirable interaction between the bottom rail and the intermediate rail can be prevented during operation, which may ensure reliable operation of the control modules respectively coupled to the bottom rail and the intermediate rail. Because tensioning and loosening states of suspension cords are used for switching the limiting mechanisms between the locking and unlocking state, variation in the travel range set for the intermediate rail and the bottom rail would not affect the construction of the limiting mechanisms, which thus can be suitable for use with various sizes of window shades.

Realizations of the structures have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the claims that follow.

What is claimed is:

1. An actuating system for a window shade, comprising:

a rotary axle coupled to an axle connector;

a cord winding assembly coupled to the rotary axle and connected with a plurality of suspension cords, the rotary axle and the axle connector being rotatable in unison about a rotation axis to cause the cord winding assembly to wind and unwind the suspension cords for displacing a movable rail of a window shade; and a limiting mechanism including a latch coupled to one of the suspension cords, the latch being movable between a locking state for preventing rotation of the rotary axle and an unlocking state for rotation of the rotary axle, the limiting mechanism being configured so that tensioning and loosening of the one of the suspension cords causes the latch to switch between the locking state and the unlocking state;

wherein the axle connector includes an adapter rotationally coupled to the rotary axle so that relative rotation between the rotary axle and the adapter is prevented, and a sleeve disposed around the adapter, the latch being engaged with the sleeve of the axle connector in the locking state and disengaged from the sleeve of the axle connector in the unlocking state, the axle connector being configured to allow a limited range of free rotational displacement of the adapter and the rotary axle relative to the sleeve, and an engagement of the latch with the sleeve of the axle connector preventing the sleeve of the axle connector from rotating about the rotation axis in two opposite directions; and wherein tensioning of the one of the suspension cords causes the latch to switch to the unlocking state, loosening of the one of the suspension cords causes the latch to switch to the locking state, and the adapter and the rotary axle are rotatable in unison relative to the sleeve in one of the two opposite directions to actuate the cord winding assembly for tensioning the one of the suspension cords while the sleeve is engaged by the latch and is prevented from rotating in the two opposite directions.

2. The actuating system according to claim 1, wherein the limiting mechanism further includes a resilient part connected with the latch, the latch being biased by the resilient part toward the locking state.

3. The actuating system according to claim 2, wherein tensioning of the one of the suspension cords urges the latch to move to the unlocking state against a biasing force of the resilient part.

4. The actuating system according to claim 1, wherein the one of the suspension cords is movable in sliding contact with the latch as the rotary axle rotates to cause the cord winding assembly to wind and unwind the suspension cords.

5. The actuating system according to claim 1, wherein the one of the suspension cords is threaded through a passage provided on the latch at a location eccentric from the rotary axle.

6. The actuating system according to claim 1, wherein the latch slides for switching between the locking state and the unlocking state.

7. The actuating system according to claim 1, wherein the limiting mechanism includes a housing having a first and a second end opposite to each other, the latch being disposed inside the housing, the rotary axle and the one of the suspension cords entering the housing at the first end and exiting the housing at the second end.

8. The actuating system according to claim 7, wherein the one of the suspension cords includes a turn portion that extends through the latch inside the housing.

9. The actuating system according to claim 1, further comprising a control module operatively coupled to the rotary axle at an end thereof, the control module being operable to drive the rotary axle in rotation.

10. The actuating system according to claim 1, further comprising:

a second rotary axle rotatable for displacing another movable rail of the window shade; and a second limiting mechanism including a second latch coupled to one of the suspension cords, the second latch being movable between a locking state for preventing rotation of the second rotary axle and an unlocking state for rotation of the second rotary axle, the second limiting mechanism being configured so that tensioning and loosening of the one of the suspension cords causes the second latch to switch between the locking state and the unlocking state.

11. A window shade comprising:

a head rail, a bottom rail, and an intermediate rail between the head rail and the bottom rail;

a shading structure disposed between the intermediate rail and the bottom rail; and the actuating system according to claim 1, wherein the suspension cords are connected with the intermediate rail, the latch of the limiting mechanism being in the locking state when the intermediate rail is adjacent to or in contact with the bottom rail and in the unlocking state during an adjustment of the intermediate rail relative to the head rail and the bottom rail.

12. A window shade comprising:

a head rail, a bottom rail, and an intermediate rail between the head rail and the bottom rail;

a shading structure disposed between the intermediate rail and the bottom rail; and the actuating system according to claim 10, wherein the suspension cords are connected with the intermediate rail, and the second rotary axle is rotatable for displacing the bottom rail, the latch of the limiting mechanism or the second latch of the second limiting mechanism being in the locking state when the intermediate rail is adjacent to or in contact with the bottom rail and in the unlocking state during an adjustment of the intermediate rail relative to the head rail and the bottom rail.

13. The actuating system according to claim 1, wherein the latch has a cavity through which is disposed the axle connector, and a protrusion provided inside the cavity that is adapted to engage with and disengage from the sleeve of the axle connector.

14. The actuating system according to claim 1, wherein the latch encircles the axle connector.

15. An actuating system for a window shade, comprising:

a rotary axle coupled to an axle connector;

a cord winding assembly coupled to the rotary axle and connected with a plurality of suspension cords, the rotary axle and the axle connector being rotatable in unison to cause the cord winding assembly to wind and unwind the suspension cords for displacing a movable rail of a window shade; and a limiting mechanism including a latch that is coupled to one of the suspension cords and encircles the axle connector, wherein the latch is movable between a locking state where the latch engages with the axle connector for preventing rotation of the rotary axle, and an unlocking state where the latch is disengaged from the axle connector for rotation of the rotary axle, the limiting mechanism being configured so that tensioning and loosening of the one of the suspension cords causes the latch to switch between the locking state and the unlocking state;

wherein the axle connector includes an adapter rotationally coupled to the rotary axle so that relative rotation between the rotary axle and the adapter is prevented, and a sleeve disposed around the adapter, the latch being engaged with the sleeve in the locking state and disengaged from the sleeve in the unlocking state, the axle connector being configured to allow a range of rotational displacement of the adapter and the rotary axle that actuates the cord winding assembly while the sleeve is prevented from rotating.

16. The actuating system according to claim 15, wherein an engagement of the latch with the sleeve prevents the sleeve from rotating in two opposite directions.

17. The actuating system according to claim 16, wherein the adapter and the rotary axle are configured to be rotatable in unison relative to the sleeve in one of the two opposite directions for tensioning the one of the suspension cords while the sleeve is engaged by the latch and is prevented from rotating in the two opposite directions.

* * * * *